(12) United States Patent
Kamalasadan et al.

(10) Patent No.: US 11,984,759 B2
(45) Date of Patent: May 14, 2024

(54) GRID ANCILLARY SERVICE WITH UNINTERRUPTIBLE POWER SUPPLY

(71) Applicant: THE UNIVERSITY OF NORTH CAROLINA AT CHARLOTTE, Charlotte, NC (US)

(72) Inventors: Sukumar Kamalasadan, Concord, NC (US); Robin Bisht, Charlotte, NC (US); Sherif Abdelrazek, Huntersville, NC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 178 days.

(21) Appl. No.: 17/611,665

(22) PCT Filed: May 19, 2020

(86) PCT No.: PCT/US2020/033619
§ 371 (c)(1),
(2) Date: Nov. 16, 2021

(87) PCT Pub. No.: WO2020/236826
PCT Pub. Date: Nov. 26, 2020

(65) Prior Publication Data
US 2022/0216726 A1 Jul. 7, 2022

Related U.S. Application Data

(60) Provisional application No. 62/850,104, filed on May 20, 2019.

(51) Int. Cl.
*H02J 9/06* (2006.01)
*H02J 3/32* (2006.01)
(Continued)

(52) U.S. Cl.
CPC ............... *H02J 9/062* (2013.01); *H02J 3/32* (2013.01); *H02J 7/0063* (2013.01); *H02J 2207/20* (2020.01); *H02M 7/53871* (2013.01)

(58) Field of Classification Search
CPC ............ H02M 7/53871; H02J 2207/20; H02J 7/0063; H02J 3/32; H02J 9/062
(Continued)

(56) References Cited

U.S. PATENT DOCUMENTS 6,295,215 B1 * 9/2001 Faria ..................... H02J 9/062
363/124
8,410,638 B2 4/2013 Johnson
(Continued)

FOREIGN PATENT DOCUMENTS

WO 2017222966 A1 12/2017

OTHER PUBLICATIONS

Notification of Transmittal of the International Search Report and the Written Opinion of the International Searching Authority, or the Declaration, in corresponding PCT Application No. PCT/US2020/033619 (dated Aug. 26, 2020).

*Primary Examiner* — Michael R. Fin
(74) *Attorney, Agent, or Firm* — Myers Bigel, P.A.

(57) ABSTRACT

Methods of operating a grid ancillary service with an uninterruptible power supply (GAUPS) device are provided. A method of operating a GAUPS device includes controlling a switch of the GAUPS device in response to a signal that is generated by the switch, to control efficiency of an inverter and quality of power supplied to a load via the inverter. The switch is coupled between the inverter and the load. Related systems and devices are also provided.

20 Claims, 12 Drawing Sheets

(51) Int. Cl.
*H02J 7/00* (2006.01)
*H02M 7/5387* (2007.01)

(58) Field of Classification Search
USPC .................................................. 307/64, 66
See application file for complete search history.

(56) References Cited

U.S. PATENT DOCUMENTS

| | | | |
|---|---|---|---|
| 10,432,082 B1* | 10/2019 | Sharifipour | H02M 1/10 |
| 2013/0264865 A1* | 10/2013 | Sugeno | H02J 3/322 |
| | | | 307/19 |
| 2014/0368042 A1* | 12/2014 | Giuntini | H02J 3/1864 |
| | | | 307/64 |
| 2015/0035359 A1* | 2/2015 | Chung | H02J 9/062 |
| | | | 307/23 |
| 2015/0054343 A1 | 2/2015 | Cui | |
| 2016/0064985 A1 | 3/2016 | Tao et al. | |
| 2017/0003701 A1 | 1/2017 | Miller et al. | |
| 2019/0239367 A1* | 8/2019 | Elliott | H05K 7/20945 |

* cited by examiner

US 11,984,759 B2

GRID ANCILLARY SERVICE WITH UNINTERRUPTIBLE POWER SUPPLY

CROSS-REFERENCE TO RELATED APPLICATION

The present application is a 35 U.S.C. 371 national stage application of PCT International Application No. PCT/US2020/033619, filed on May 19, 2020, which claims priority to U.S. Provisional Patent Application No. 62/850,104, filed on May 20, 2019, the entire contents of which are incorporated herein by reference.

FIELD

The present disclosure relates to uninterruptible power supply ("UPS") systems.

BACKGROUND

Many industrial loads are sensitive or are too important to shut down abruptly and may cause significant financial losses to an industry if not operated properly. These loads may be referred to herein as "critical loads" and are often protected by UPS systems. Examples of UPS systems are described, for example, in U.S. Pat. No. 8,410,638 and U.S. Patent Pub. No. 2014/0368042, the disclosures of which are hereby incorporated herein by reference in their entireties. For example, three-phase UPS systems may provide backup power to critical loads to keep them under operation during adverse grid conditions. A high penetration of intermittent renewable-based energy sources and non-linear loads on a grid, however, can undesirably cause a substantial impact on power quality.

SUMMARY

In some embodiments, a grid ancillary service with an uninterruptible power supply ("GAUPS") device/system is used for simultaneously supplying continuous power to sensitive loads and supporting ancillary services to the local grid/utility. In one embodiment, the GAUPS comprises one four-quadrant (bidirectional) inverter (a grid-side inverter) and a unidirectional two-quadrant inverter (a load-side inverter). These inverters are connected back-to-back on the direct current ("DC") side with the battery connected to a DC link. GAUPS operates in one of the following modes: (a) offline-ancillary mode, (b) double-conversion-ancillary mode, (c) grid-connected ancillary mode, or (d) independent mode. According to the invention, GAUPS can use advanced control to provide continuous high-quality power to the sensitive loads and at the same time support the power grid for ancillary services. GAUPS can thus work during grid failure/contamination, during a power quality diminishing scenario, and during normal operations with continued grid support.

A system, according to some embodiments of the invention, may include an energy storage device that is configured to supply power to a load and to supply power to a utility grid. The system may include a first inverter that is coupled between the utility grid and the energy storage device. Moreover, the system may include a second inverter that is coupled between the first inverter and the load, and the energy storage device may be coupled between the first inverter and the second inverter.

A device, according to some embodiments of the invention, may include a first inverter that is coupled between a utility grid and an energy storage device. The device may include a second inverter that is coupled between the first inverter and a load. Moreover, the energy storage device may be coupled between the first inverter and the second inverter.

A method of operating GAUPS device including first and second inverters, according to some embodiments of the invention, may include controlling a switch of the GAUPS device in response to a signal that is generated by the switch, to control efficiency of one or more of the first and second inverters and quality of power supplied to a load via the one or more of the first and second inverters. Moreover, the switch may be coupled between the second inverter and the load.

DETAILED DESCRIPTION

Figure 1:
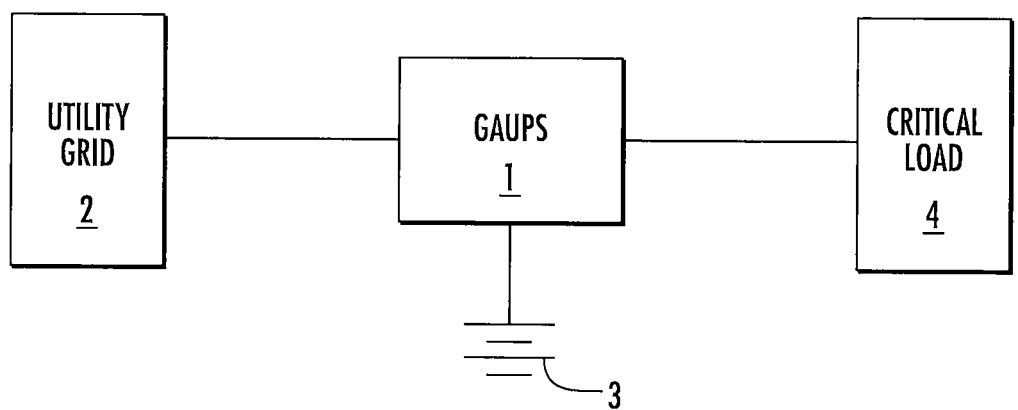
FIG. 1 is a schematic illustration of a GAUPS device providing a power connection between a utility grid and a critical load, according to the present invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

This invention relates to a UPS and grid ancillary support device/system that provides uninterruptible and clean power to critical loads and also facilitates ancillary services power supply to the grid using four-quadrant inverters. The field of engineering of the invention is electrical engineering, with a focus on power systems and power electronics.

The invention relates generally to applied power electronics in power systems and more specifically to UPS systems and methods and to providing grid ancillary service using a battery and a battery management system.

A GAUPS device may be operated in a line-interactive mode, which is highly efficient (96%-98%) when compared to a double-conversion operation (85%-92%) where power flows through back-to-back unidirectional power converters from the grid. As used herein, the term "unidirectional" refers to a device that can only perform an alternating current ("AC")-to-DC power conversion or can only perform a DC-to-AC power conversion, but not both. For a conventional double-conversion operation, two unidirectional devices are used and efficiency is lost with each power conversion. In particular, a conventional system must always use both a rectifier and an inverter, and the use of both of these unidirectional devices is less efficient than using only one of them. By contrast, a GAUPS device according to the invention can independently use one of its inverters without using the other inverter, thus improving efficiency. As an example, the GAUPS device can reduce the number of conversions for power flowing from the grid to a load.

A high penetration of renewable-based energy sources and non-linear loads on the grid can cause a substantial impact on power quality. The ability of a device/system to provide power-quality improvement services may be important, especially with a high penetration of renewable energy. Providing grid support (e.g., voltage support, frequency support, smoothing of renewable energy resource(s)) is a new paradigm that uses battery energy storage along with inverters. Such devices/systems can be used to control power grid changes and to balance the renewable-energy impact on the power grid. Though such features are conventionally not implemented in the UPS domain, a GAUPS device according to the present invention can perform grid ancillary services while managing reliable and clean power to sensitive loads. For example, when the capacity of the GAUPS device is not being fully used to supply backup power to a load, the GAUPS device can supply power to the grid. Moreover, whereas a lack of information about power quality may result in overuse of a conventional UPS, the GAUPS device can sense the grid and then use the grid or one or more of the GAUPS device's inverters when required/demanded, thus providing improved controllability, efficiency, and power quality.

As used herein, the term "smoothing" refers to providing non-fluctuating power. For example, in the absence of a battery and grid support, power from a solar photovoltaic system will change based on the sunlight it receives. Grid support allows renewable smoothing, thus firming up power capacity. The present invention may advantageously provide grid support in addition to UPS functionality.

A GAUPS device may use static switches and control methodology in realizing a dual-management scheme. For example, a grid-side inverter may be dedicated to providing ancillary services to the grid and a load-side inverter may provide regulated AC voltage and frequency to loads during abnormal grid conditions. The AC power to the loads is shared between the grid and the energy source/storage depending on grid conditions and needs, which revolve around ancillary service demand, and this may be provided by the energy source/storage connected to the grid-side inverter.

A typical UPS device performs the function of providing backup power to critical loads, conditioning incoming power from the grid, and providing ride-through power. Examples of UPS systems that have been explored are:

Standby UPS equipment that is connected to the grid and is allowed to consume power from the grid until the UPS detects a problem. Such a UPS switches to battery power after the detection and the load is fed through an inverter interface.

Line-interactive UPS: Equipment is fed by the grid, which is regulated as seen fit. This is done by boosting or bucking the utility voltage before power reaches the load. This type of UPS also has battery backup power in the event of a grid outage.

Double-conversion UPS: Galvanic isolation from the grid is provided by converting the AC power to DC and back to AC while conditioning the power and providing the load with clean and reliable power.

Multi-mode UPS: This is combination of the three previously-stated UPSs. Normal conditions see a line-interactive mode of operation by the UPS. An erratic or abnormal grid, however, causes the UPS to operate in double-conversion mode, and a grid outage or sustained abnormalities cause the battery to kick in and provide power to a critical load.

Some embodiments of the invention contribute to an uninterruptible power supply to critical loads, and some embodiments provide ancillary services to a utility grid (e.g., an electric grid of an electric utility). These processes can occur simultaneously, according to the present invention. For example, a GAUPS device can be operated in different modes, which depend on the overall health of the utility grid. Under normal operations, the utility grid is directly coupled with a load, and this is also known as grid-connected ancillary mode. This is realized by a control circuit using transfer-switching elements that connect and disconnect the grid and a load-side inverter according to the mode of operation. In the grid-connected ancillary mode of operation, the load-side inverter and the energy storage element are disconnected from the load. Conversely, the grid-side inverter can be in operation and, if needed, the grid-side inverter can supply ancillary power to the grid. This power is delivered by the energy storage element connected to the DC link of the grid-side inverter and the load-side inverter. This is realized by a control circuit that generates pulse-width modulation ("PWM") pulses for the grid-side inverter based on the active and reactive power demand from the utility. As used herein, the term "connected" may refer to multiple elements that are electrically connected (or coupled) to each other.

Under adverse grid conditions, the control circuit modifies the device/system architecture to one of the different modes of operation; namely, (i) offline ancillary mode, (ii) double-conversion ancillary mode, or (iii) independent mode. The grid is effectively isolated from the load due to this process, but remains coupled to the GAUPS via the two inverters that are connected back-to-back on the DC side, and the energy storage element is still connected to the common DC link. This provides a path for power to flow from the grid to the load, and the power is conditioned because of the AC to DC and DC to AC conversion. This helps to provide power factor correction and to reduce/minimize voltage fluctuations that may be present in the grid and may affect the sensitive load. Advantageously, the grid-side inverter can perform ancillary services for the grid during the double-conversion ancillary mode if needed/demanded. The battery provides for the load and the ancillary services if there is a demand from the utility. Examples of ancillary services include frequency support, voltage support, renewable energy capacity firming, solar photovoltaic smoothing, power balancing, and voltage-profile management. The control circuit generating the PWM pulses for the grid-side inverter can operate it in the double-conversion ancillary mode, which enables the inverter to withdraw power from the battery according to the demand on/by the AC side or the utility.

Under grid outages (independent mode of operation), the control circuit alters the architecture of the device/system such that the energy storage element and the load-side inverter are coupled with the load. In this process, transfer switches isolate and decouple the grid from the load completely. The control circuit generates the PWM pulses for the load-side inverter based on maintaining constant voltage and frequency on the output of the inverter, hence providing or 'forming' the grid for the critical loads.

Figure 2:
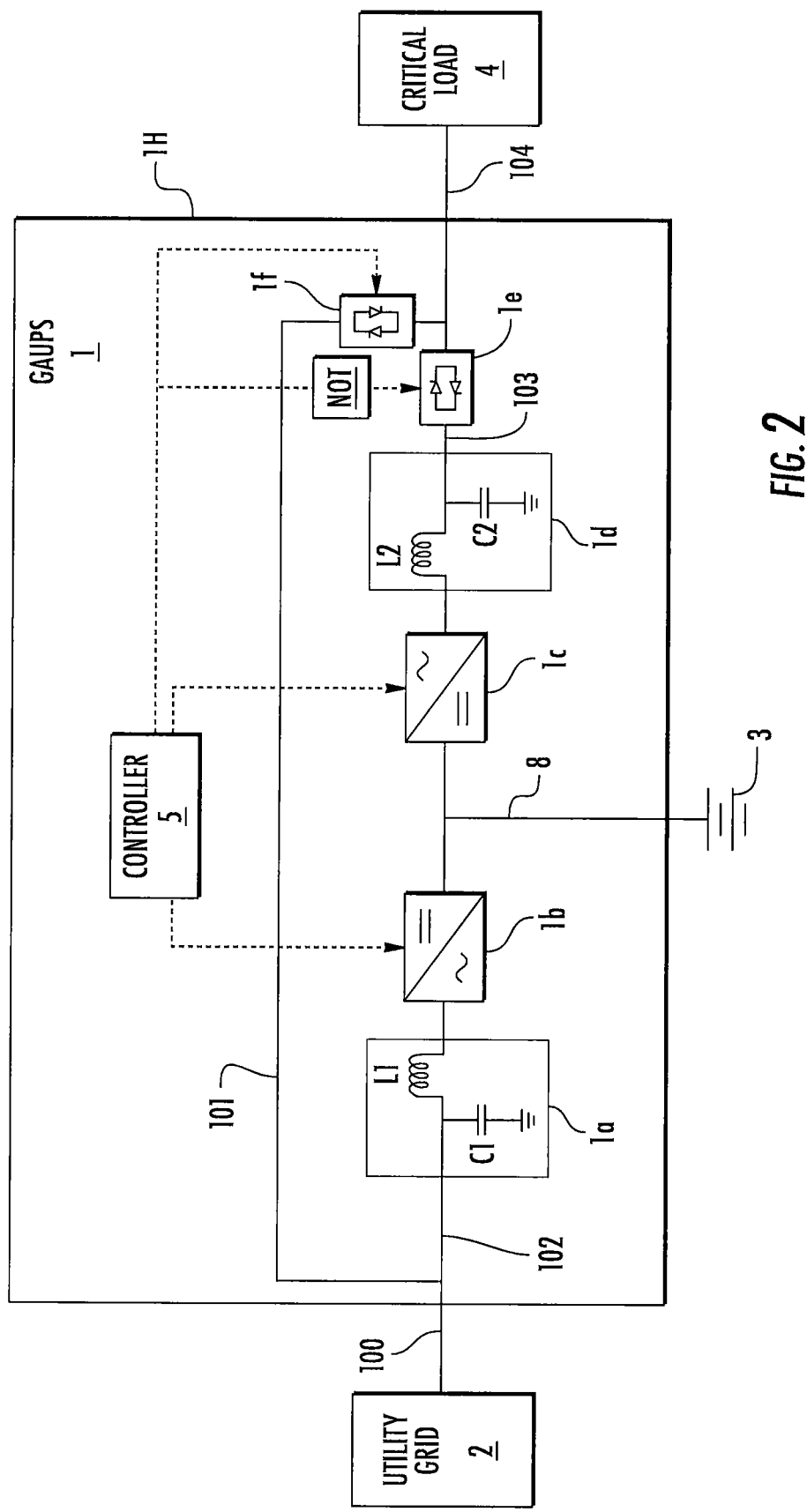
FIG. 2 is a detailed schematic diagram of the GAUPS device of FIG. 1 that illustrates internal connections between inverters, the grid, and the critical load.

Referring to FIGS. 1 and 2, a power source or a utility grid 2 is connected via a path 100 as an input to a GAUPS device 1. As used herein, the term "path" refers to an electrically-conductive path, such as a path that supports providing 50-400 kilowatts ("kW") of power. A critical load 4 is connected via a path 104 on the output of the GAUPS device 1. This load 4 can be any type of sensitive industrial load that requires consistent and reliable power (i.e., always-on power that is free of even momentary outages). An example of a sensitive industrial load is a load used for plastic manufacturing, which is a process that depends on power quality and is sensitive to voltage fluctuations. Accordingly, the term "sensitive," as used herein, refers to vulnerability to voltage changes, such as power flicker. For example, the load 4 may be a 50-400 kW load. In some embodiments, multiple critical loads 4 can be connected to the same GAUPS device 1. An energy storage element 3 is connected on (e.g., electrically connected to) a DC link 8 of the GAUPS device 1, as shown in FIG. 2. The energy storage element 3 is typically a device such as a battery. FIG. 1 is a schematic of external connections of the GAUPS device 1.

FIG. 2 is a detailed schematic of the GAUPS device 1. The GAUPS device 1 comprises a grid-side inverter 1b that is coupled to the utility grid 2 via an inductor-and-capacitor filter bank 1a, and the critical load 4 is connected to a load-side inverter 1c via an inductor-and-capacitor filter bank 1d. The load-side inverter 1c may be a unidirectional inverter that converts DC power stored in the energy storage element 3 into AC power that can be supplied to the critical load 4. The grid-side inverter 1b, on the other hand, may be a bidirectional inverter that performs both DC-to-AC power conversion and AC-to-DC power conversion. By connecting the inverters 1b and 1c as shown in FIG. 2, the GAUPS device 1 can provide increased control over power quality and efficiency. As an example, the GAUPS device 1 can provide higher-quality power to a customer by connecting the inverters 1b and 1c back-to-back (i.e., consecutively) and by actively managing them via a controller 5. The inverters 1b and 1c may each be configured to convert power in a range of 50-400 kW. Moreover, the filter banks 1a and 1d may each include multiple filters. Each filter in the filter bank 1a includes at least one capacitor C1 and at least one inductor L1. Similarly, each filter in the filter bank 1d includes at least one capacitor C2 and at least one inductor L2.

As shown in FIG. 2, the inverter 1b is coupled between the grid 2 and the energy storage element 3, the inverter 1c is coupled between the inverter 1b and the load 4, and the energy storage element 3 is coupled (via the DC link 8) between the inverter 1b and the inverter 1c. Moreover, the GAUPS device 1 may include a switch 1e that is coupled between the inverter 1c and the load 4, and the switch 1e may be configured to detect power demand by the load 4.

In some embodiments, the inverters 1b and 1c may be inside the same housing 1H, such as a metal and/or plastic outer cover, of the GAUPS device 1.

Accordingly, the GAUPS device 1 may be referred to herein as a single "apparatus" or "device." For example, the housing 1H may have dimensions of 25 feet by 25 feet or smaller. As another example, the housing 1H may have dimensions of 6 feet by 6 feet or smaller. The size may vary depending on context/setting in which the GAUPS device 1 is used (e.g., the size may be larger in an industrial setting than in a data center). Moreover, though the inverters 1b and 1c may, in some embodiments, be inside separate housings, it may still be beneficial for the inverters 1b and 1c to have relatively close proximity to each other, such as being within 10 to 30 feet of each other.

Static transfer switches 1e and 1f are used to disconnect and connect the grid 2 and the load-side inverter 1c from the critical load 4, depending upon the mode of operation of the GAUPS device 1, which is determined by the controller 5. The static switches 1e and 1f are fast-acting solid state switches and can operate in the order of micro-seconds. In some embodiments, a fast-acting sensor NOT may be coupled between the controller 5 and the switches 1e and 1f, and may help the controller 5 manage the switches 1e and 1f. The controller 5 can advantageously (i) manage power quality when supplying power to the load 4, (ii) manage efficiency of the inverters 1b and 1c (e.g., by managing the switches 1e and 1f), and/or (iii) support the grid 2.

FIG. 2 also shows the energy storage element 3 coupled with the inverters 1b and 1c on the DC link (e.g., a DC bus) 8. There is no DC-DC converter involved in the architecture, which has been included in other previous UPS architectures. Accordingly, the GAUPS device 1 may be free of (i.e., may not include) any DC-DC converter. The controller 5 can be any microcontroller capable of generating PWMs and performing analog-to-digital conversion ("ADC") for data acquisition. Moreover, the controller 5 may include multiple microcontrollers, such as two microcontrollers that control the inverters 1b and 1c, respectively, and one microcontroller that controls the switches 1e and 1f. For example, a microcontroller that is connected to the inverter 1b can control ancillary services that the inverter 1b provides to the grid 2. Moreover, the switches 1e and 1f can continuously sense power supplied by the grid 2 and power demanded by the load 4 and the grid 2, and can be controlled (i.e., can be switched) to balance (a) efficiency of the inverters 1b and 1c and (b) power quality.

The controller(s) 5 and/or the switches 1e and 1f may share the housing 1H with the inverters 1b and 1c. Alternatively, the controller(s) 5 and/or the switches 1e and 1f may be in one or more boxes that are outside of the housing 1H.

Figure 7:
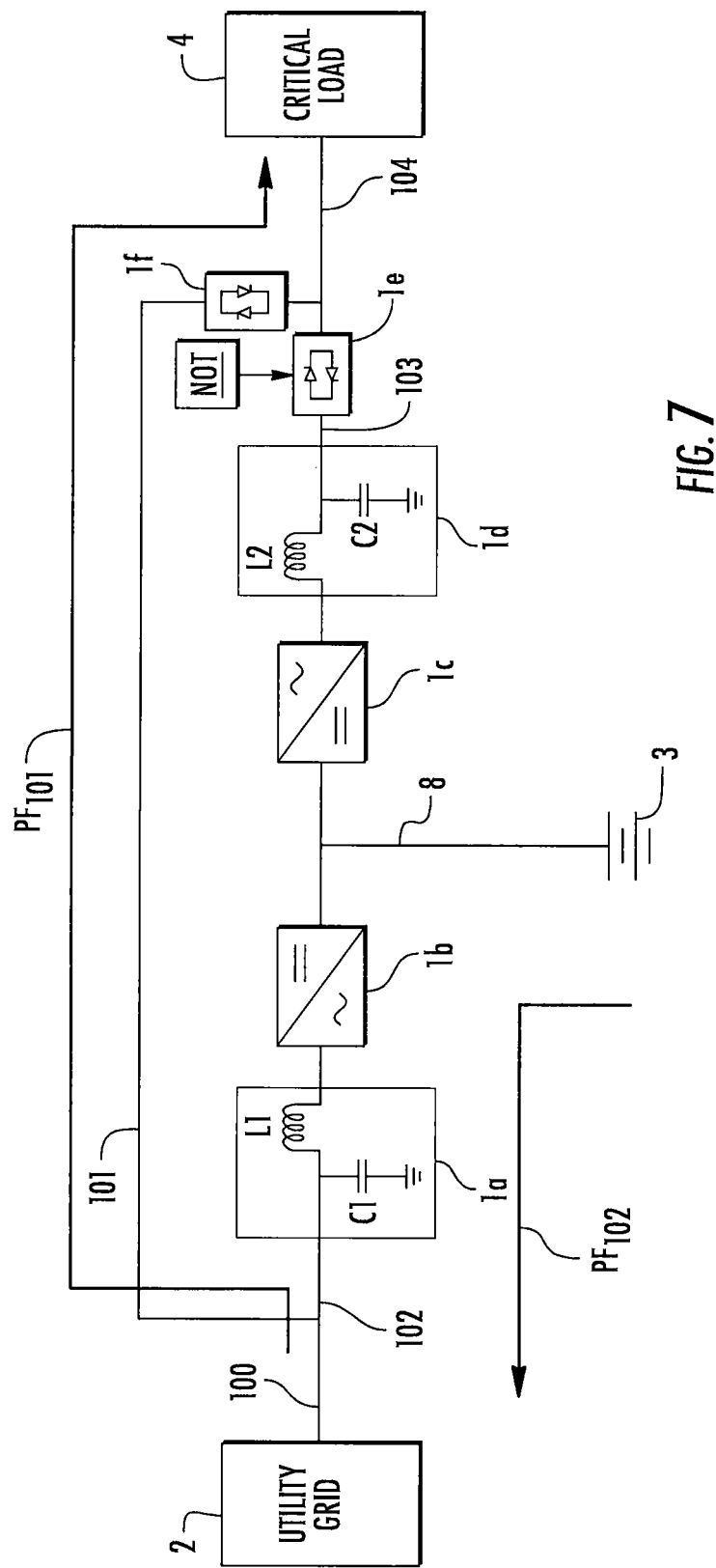
FIG. 7 is a schematic diagram showing a grid-connected ancillary mode power flow.

The GAUPS device 1 is capable of operating in different modes, depending on the state of the utility grid 2. The state of the grid 2 is monitored by the controller 5, which determines the mode of operation of the GAUPS device 1 and dictates the switching of the static switches 1e and 1f and the inverters 1b and 1c. In the grid-connected ancillary mode, power $PF_{101}$ flows as shown in FIG. 7, and the grid 2 is connected to the load 4 via a path 101. This power $PF_{101}$ from the grid 2 bypasses the two inverters 1b and 1c, and directly feeds the load 4. This is accomplished by the controller 5 using the transfer switch 1f, which couples the grid 2 to the load 4, and disconnecting the transfer switch 1e. The grid-side inverter 1b can remain active in this mode if ancillary services are demanded by the utility grid 2. This may only be realized if the grid-side inverter 1b is capable of transferring and/or controlling the stipulated active and reactive power. The controller 5 limits the power flow through the inverter 1b if the ancillary demand is greater than what is asked by the sensitive load 4, which takes priority. Hence, the control on the inverter 1b is based on active and reactive power control. If ancillary services are demanded by the grid 2, the energy storage element 3 activates and supplies the demanded power $PF_{102}$ via a path 102.

Figure 3:
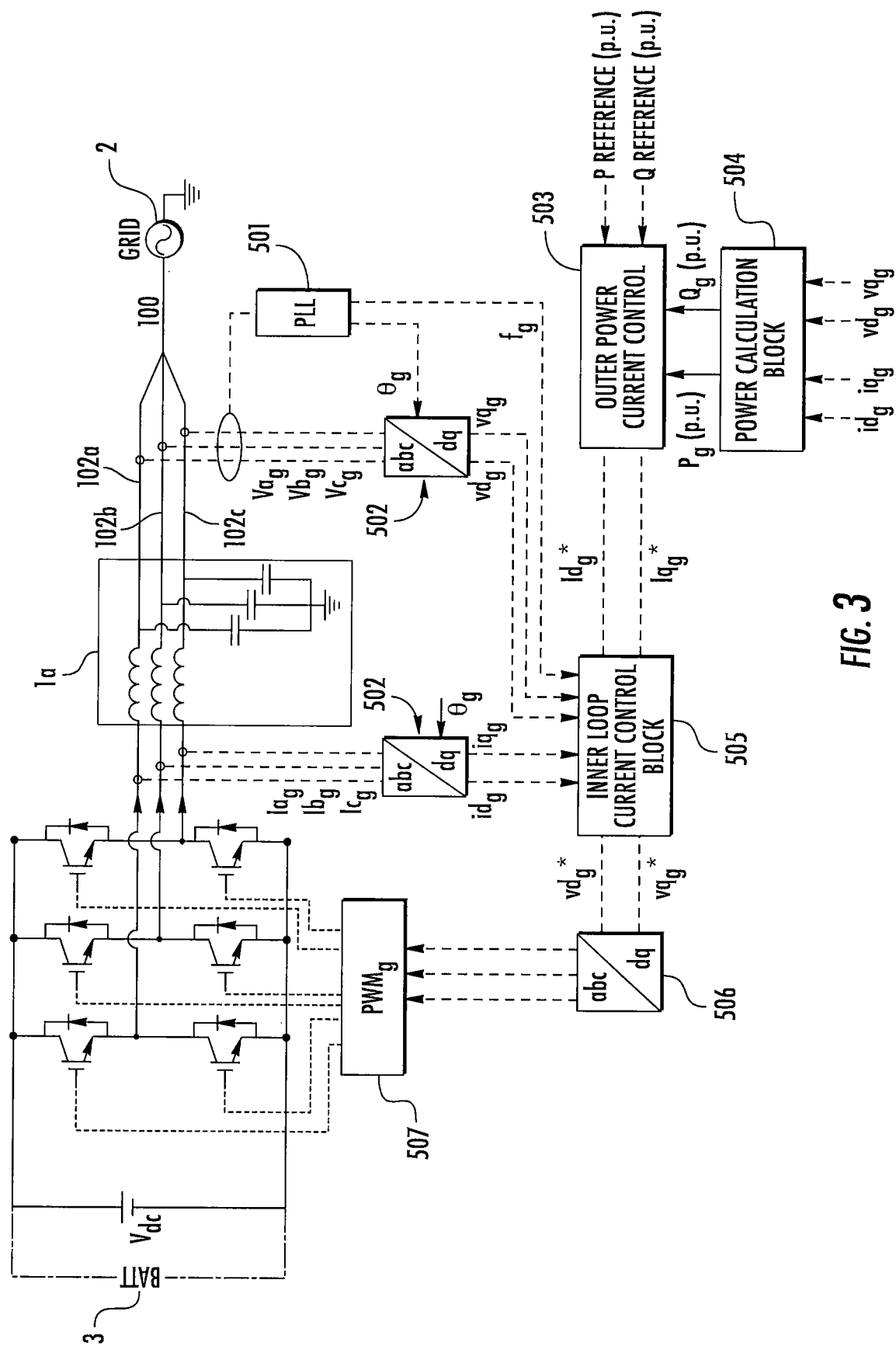
FIG. 3 is a schematic diagram illustrating a grid-side inverter implementation and a control structure for the GAUPS device of FIG. 2.
Figure 4:
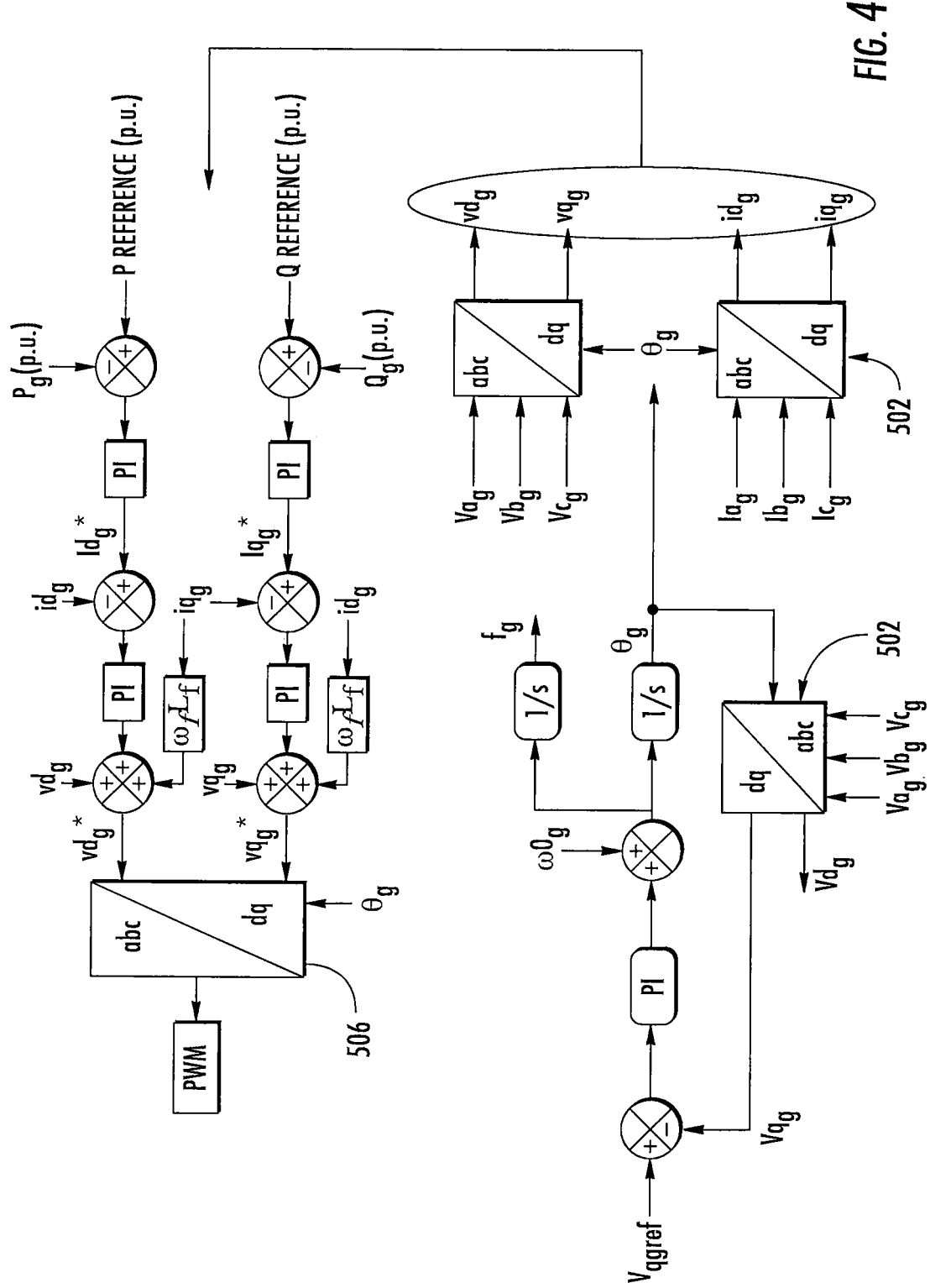
FIG. 4 is a schematic diagram illustrating the control architecture in detail for the grid-side inverter shown in FIG. 3.

The controller 5 generates the PWMs for the grid-side inverter 1b. In FIGS. 3 and 4, details of the grid-side inverter 1b and its control architecture are shown. The current and voltage measurements from the output filter of the grid-side inverter 1b are converted to their respective dq-domain signals using Park's transformation 502 and per unitized ("p.u.") according to the base of the inverter power level and voltage. Hence, voltage $Va_g$, voltage $Vb_g$, voltage $Vc_g$, current $Ia_g$, current $Ib_g$, and current $Ic_g$ in the abc domain convert to voltage $vd_g$, voltage $vq_g$, current $id_g$, and current $iq_g$ in the dq domain. Power flowing on the output of the grid-side inverter 1b is calculated using the current and voltage signals in the dq domain and providing them to the power calculation block 504, which generates the necessary signals for active and reactive power control. The active and reactive power reference set points create an error signal with the actual power flowing on the output of the inverter 1b, and the outer power control loop 503 generates the necessary current demand in the dq domain $Id_g^*$ and $Iq_g^*$. The error signal is generated by comparing the reference current signals $Id_g^*$ and $Iq_g^*$ with the actual currents $id_g$ and $iq_g$ flowing out of the inverter 1b. The inner current control loop 505 uses the error to generate the dq domain voltage references $vd_g^*$ and $vq_g^*$. The signals $vd_g^*$ and $vq_g^*$ are transformed to the abc domain using the inverse Park's transformation 506 to create the reference wave for PWM generation ("$PWM_g$") 507. The phase angle used by the transformation blocks comes from the phase locked loop block 501, which monitors voltage across the filter bank 1a. In the grid-connected ancillary mode, the static switch 1f interfaces the grid 2 with the load 4, and the other static switch 1e works conversely by denying the interconnection of inverter 1c with the load 4.

Figure 8:
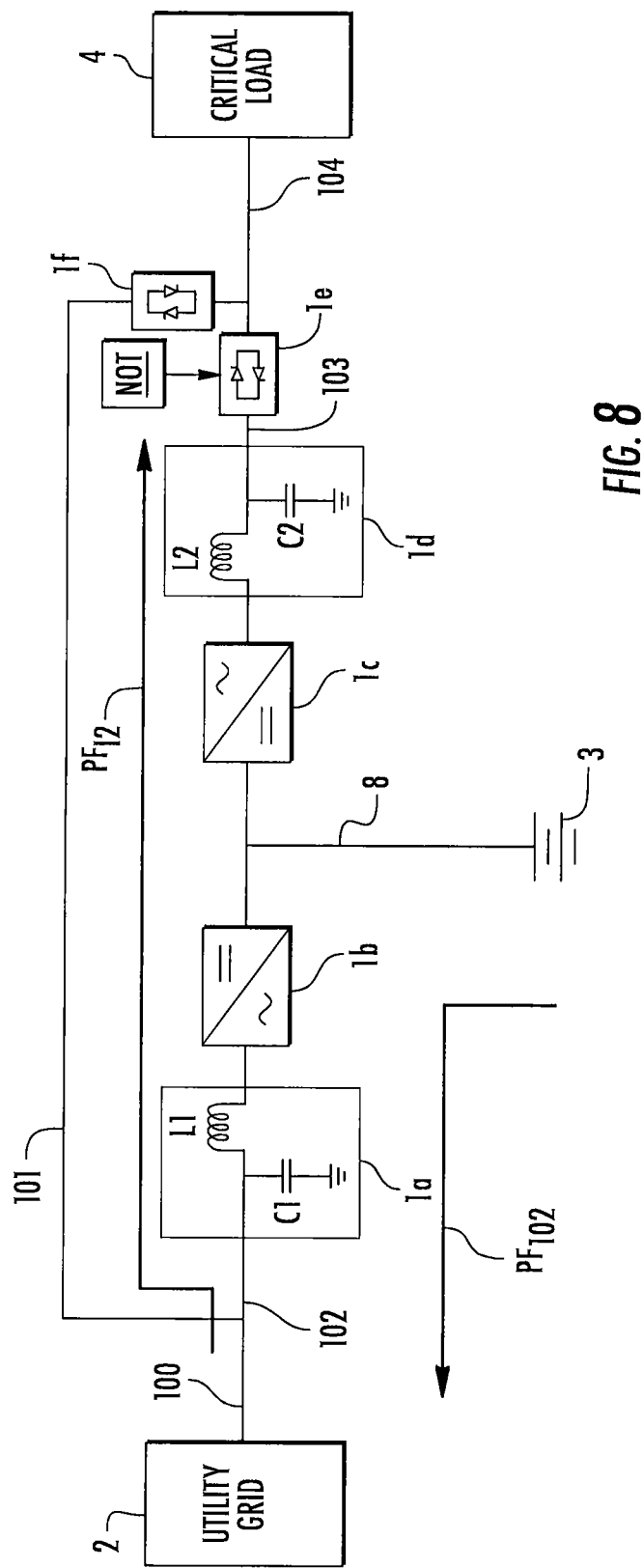
FIG. 8 is a schematic diagram illustrating power flow during a double-conversion ancillary mode of operation.

The GAUPS device 1 may operate as a power source to the critical load 4. Under normal operating conditions, the grid 2 connects directly to the load 4 using the bypass path 101. But under abnormal grid operation, the controller 5 can decide to isolate the critical load 4 from the grid 2 by disconnecting the switch 1f and connecting the inverter 1c to the load 4. Power to the load 4 can be provided in one of the following ways or modes:

As a first example, power $PF_{r2}$ (FIG. 8) can be provided to the load 4 by the grid 2 in the double-conversion ancillary mode. In this mode, the power $PF_{r2}$ goes through two conversions (AC to DC and DC to AC) provided by the grid-side inverter 1b and the load-side inverter 1c, respectively. In this mode, the energy storage element 3 can use the inverter 1b in case of ancillary service demand for power $PF_{102}$. FIG. 8 illustrates the power flow during this mode of operation.

Figure 9:
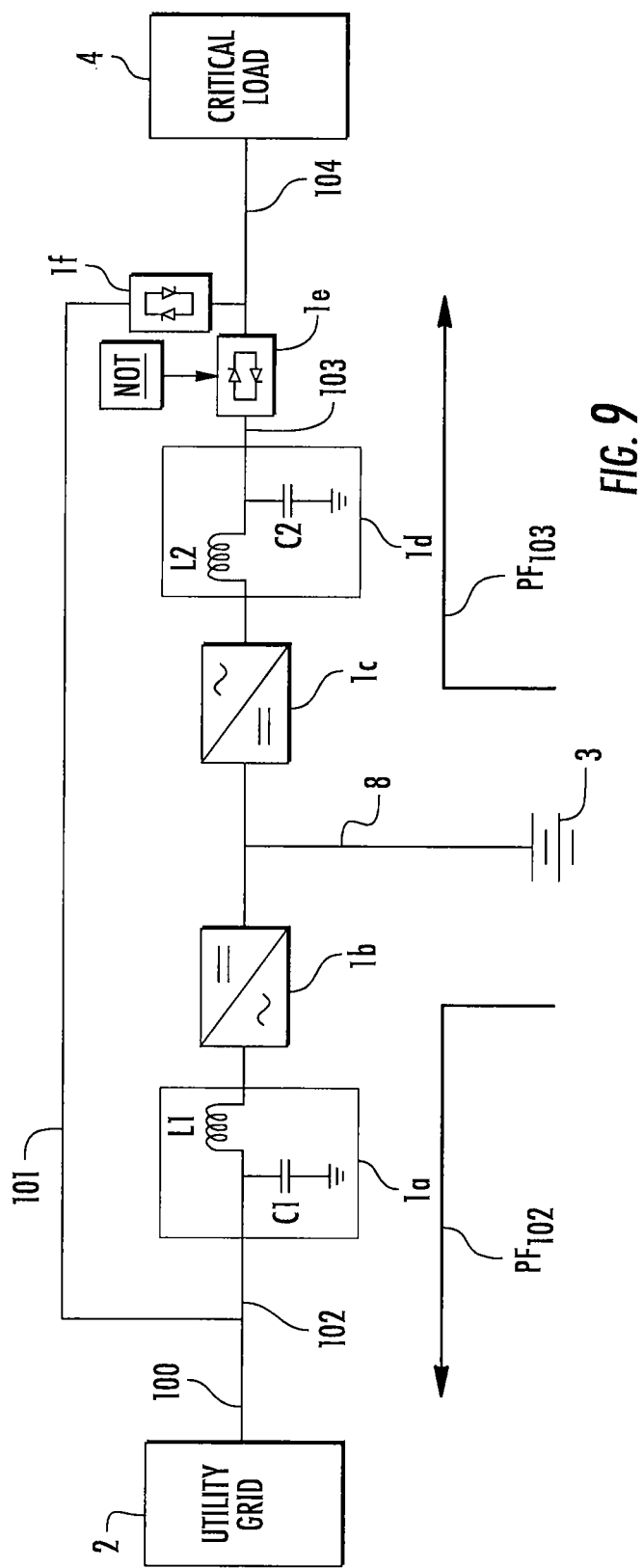
FIG. 9 is a schematic diagram illustrating power flow during an offline ancillary mode of operation.

As a second example, power $PF_{103}$ (FIG. 9) can be provided to the load 4 by the energy storage element 3 in the offline ancillary mode. In this mode, the energy storage element 3 provides power to the grid 2 and the load 4 via the inverters 1b and 1c. FIG. 9 illustrates the power flow during this mode of operation.

Figure 10:
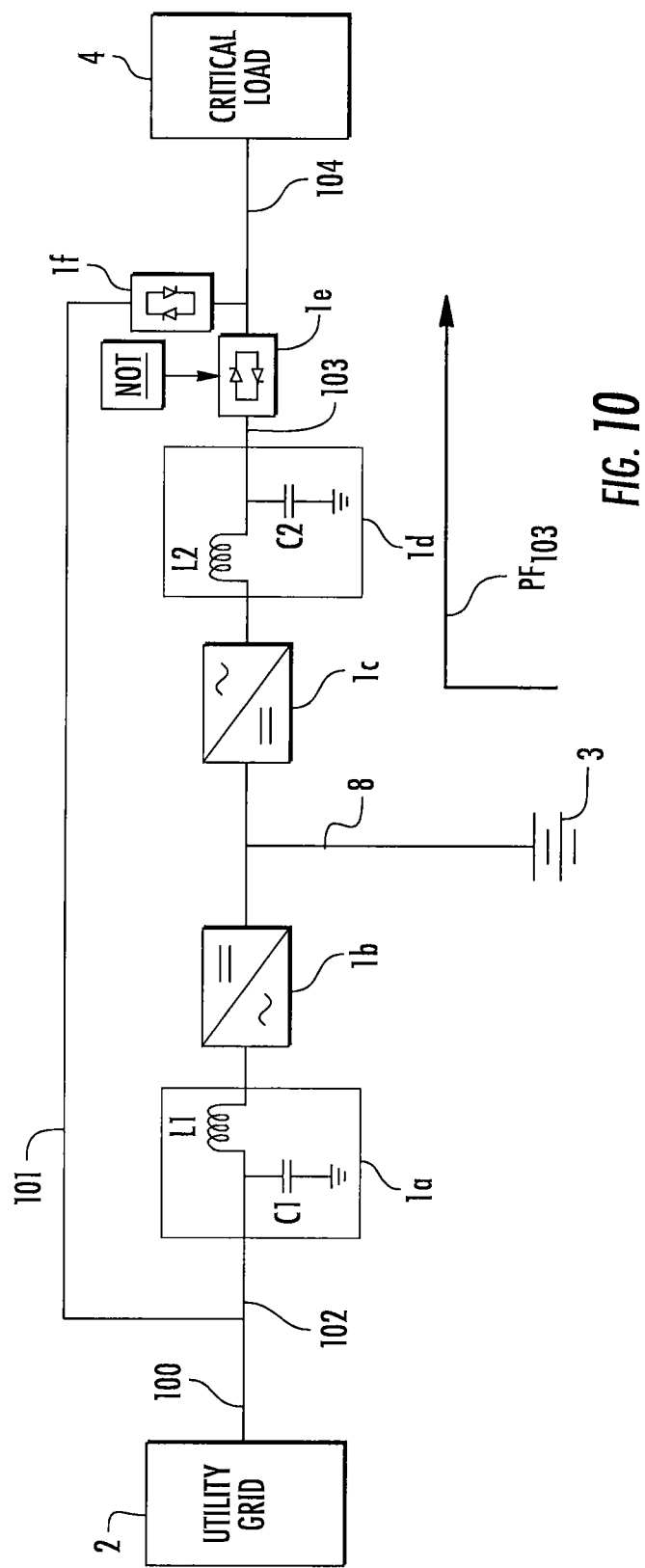
FIG. 10 is a schematic diagram illustrating power flow during an independent mode of operation.

As a third example, power $PF_{103}$ (FIG. 10) can be provided to the load 4 by the energy storage element 3 in the independent mode. This mode is initiated when the grid 2 voltage or power quality falls out of a predetermined range and is no longer a viable source of power. The controller 5 dictates the transition by switching off the inverter 1b PWM pulses. In this case, the energy storage element 3 remains active and provides clean power to the sensitive loads 4. FIG. 10 illustrates the power flow during this mode of operation.

The decision of disconnecting the grid 2 from being directly coupled with the load 4 is based on Computer and Business Equipment Manufacturers Association ("CBEMA") curve regulations. If the grid 2 violates the CBEMA curve, the controller 5 generates a trip signal to disconnect the static switch 1f and connect the static switch 1e. The grid 2 can provide power for the critical load 4 using the path 102 in the double-conversion ancillary mode. In some embodiments, the path 102 may include three parallel sub-paths 102a, 102b, and 102c (FIG. 3). If there is no ancillary service demand by the grid 2, the inverter 1b is provided with the active and reactive set points of the power flowing on the output of the load-side inverter 1c. This is done to create a negative power flow through the perspective of inverter 1b, and this is due to the four-quadrant operation of the inverter 1b. Bidirectional flow of power makes it possible for inverter 1b to operate in ancillary as well as double-conversion mode for the GAUPS device 1. If ancillary services are demanded, the energy storage element 3 provides for the ancillary services and the load 4 simultaneously via the inverter 1c.

Figure 5:
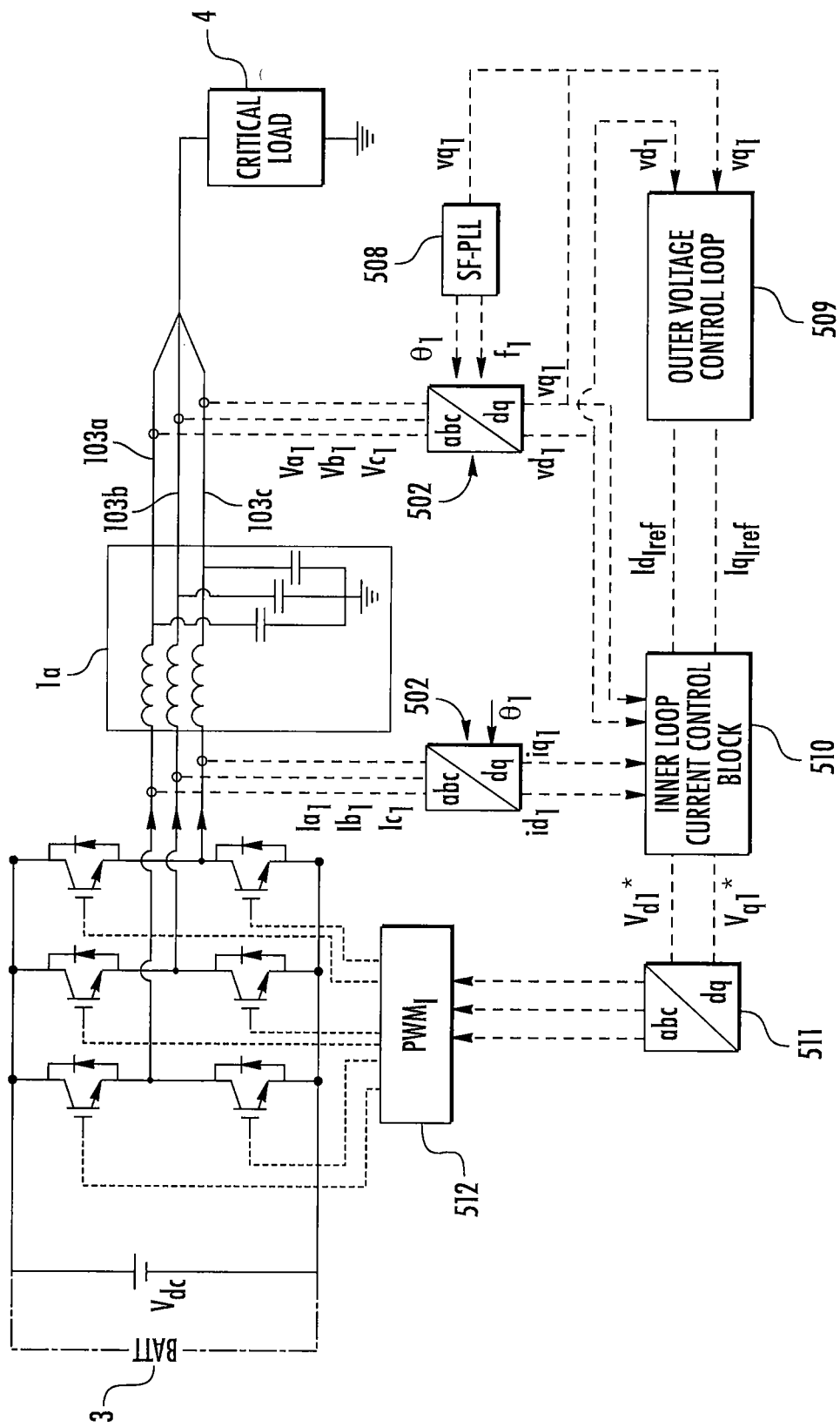
FIG. 5 is a schematic diagram illustrating the load-side inverter implementation and the control structure for the GAUPS device of FIG. 2.
Figure 6:
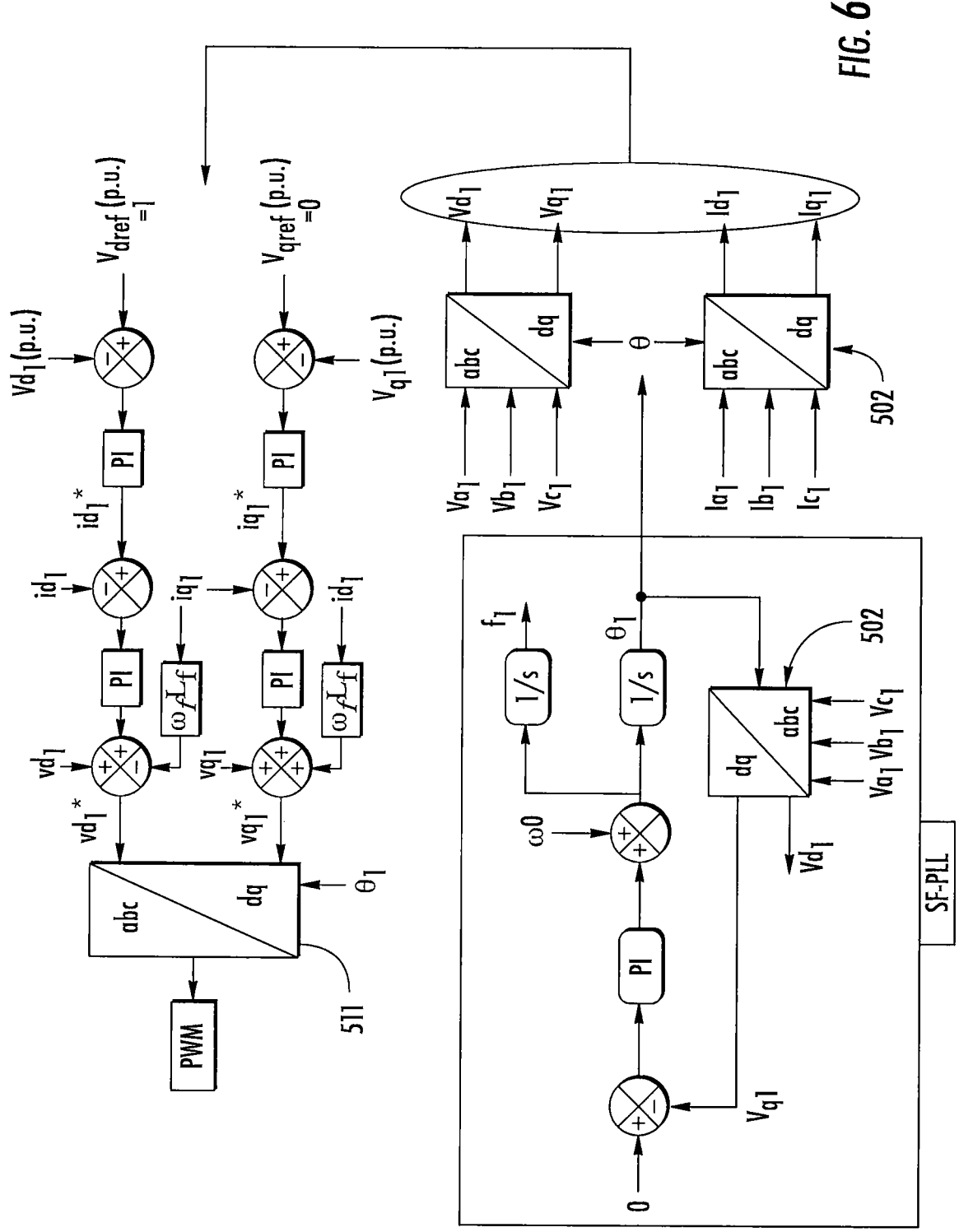
FIG. 6 is a schematic diagram illustrating the control architecture in detail for the load-side inverter shown in FIG. 5.

FIG. 5 illustrates the voltage and frequency control methodology for inverter 1c. The actual voltage and current measurements are converted to their respective dq-domain elements using Park's transformation 502. Namely, $Va_1$, $Vb_1$, $Vc_1$, $Ia_1$, $Ib_1$ and $Ic_1$ in abc domain are converted to $vd_1$, $vq_1$, $id_1$ and $iq_1$ in dq domain and per unitized according to the inverter $1c$ power level and voltage. The outer voltage control loop 509 facilitates an output voltage regulation in which the measured quantities $vd_1$ and $vq_1$ are compared with constant 1 and 0 values that correspond to the d and q elements of the voltage reference. In grid forming mode, the phase of the voltage does not have to be the same as the grid, hence the constant values to generate the voltage error. The PI controller inside the outer voltage control loop 509 uses the voltage error to generate the current references for the inner current control loop 510. The inner current control loop 510 dictates the current flow and correspondingly dictates the power flow from the DC link 8 (FIG. 2) and consequently from the energy storage element 3 attached to the DC link 8. The frequency is controlled by regulating the angle $\theta_1$ using the SF-PLL block 508. A detailed schematic diagram of the inverter $1c$ controller and the SF-PLL 508 is shown in FIG. 6. The SF-PLL 508 continuously monitors the q-component of the output voltage of inverter $1c$ and aligns it to 0, hence generating a constant 60 hertz ("Hz") frequency and corresponding $\omega t$ or $\theta_1$, which can be used to generate via a dq-to-abc transformation 511 the reference abc domain voltages for the $PWM_1$ 512. Changes in the loading on the output of inverter $1c$ will cause the voltage to fluctuate, and the outer voltage control loop 509 captures these changes and generates the corresponding current references, and hence demands the power from the DC link 8. As discussed, this can either be provided by the energy storage element 3 or the grid 2 during double-conversion, or a combination of both, depending on the ancillary and load demand.

The GAUPS device 1 will be under double-conversion ancillary mode as long as the grid-side inverter $1b$ is coupled with the grid 2. In some embodiments, this mode of operation occurs during abnormalities in the grid 2. The grid-side inverter $1b$ will allow the grid 2 to remain connected to the GAUPS device 1 as long as the grid 2 does not violate certain voltage and power quality thresholds that can decrease the efficiency of the inverters $1b$ and $1c$ and hence the overall functionality of the GAUPS device 1. If the grid 2 side voltage reaches threshold limits, pulses from the $PWM_g$ 507 (FIG. 3) to the inverter $1b$ are switched off and the grid 2 is disconnected from the GAUPS device 1. During the grid 2 outage, the load-side inverter $1c$ forms the "grid" for the load 4 and provides an interface with the energy storage element (e.g., battery) 3. Any voltage fluctuation on the AC side of the inverter $1c$ caused by the dynamics of the load 4 is propagated onto the DC side of the inverter $1c$ and is compensated by the energy storage element 3 by feeding the demanded power by the critical load 4. The grid 2, when recuperating from grid outages or abnormalities, will affect the GAUPS device 1 mode of operation upon returning to normalcy. The load-side inverter $1c$ is coupled with the load 4 during grid outages, and the load 4 power is provided by the energy storage element 3 through the path 103 (FIG. 2) via the static switch $1e$ in independent mode. The grid 2, upon returning to normalcy, will be ready to connect to the load 4 through the switch $1f$, but the voltage magnitude and phase on the output of the inverter $1c$ and filter bank $1d$ are first matched with the grid 2; this is accomplished by first enabling the double-conversion ancillary mode by the controller 5 and using the SF-PLL 508 to seamlessly transition the voltage phase angle on the output of the load-side inverter $1c$ with the grid voltage. Once the transition is complete, a voltage magnitude and phase check is performed by the controller 5 and switching signals are provided to the switches $1e$ and $1f$ to disconnect and connect, respectively. This completes the reconnection of the load 4 to the grid 2. This completes the transition from (i) independent mode to (ii) double-conversion ancillary mode to (iii) grid-connected ancillary mode of operation of the GAUPS device 1.

Figure 11:
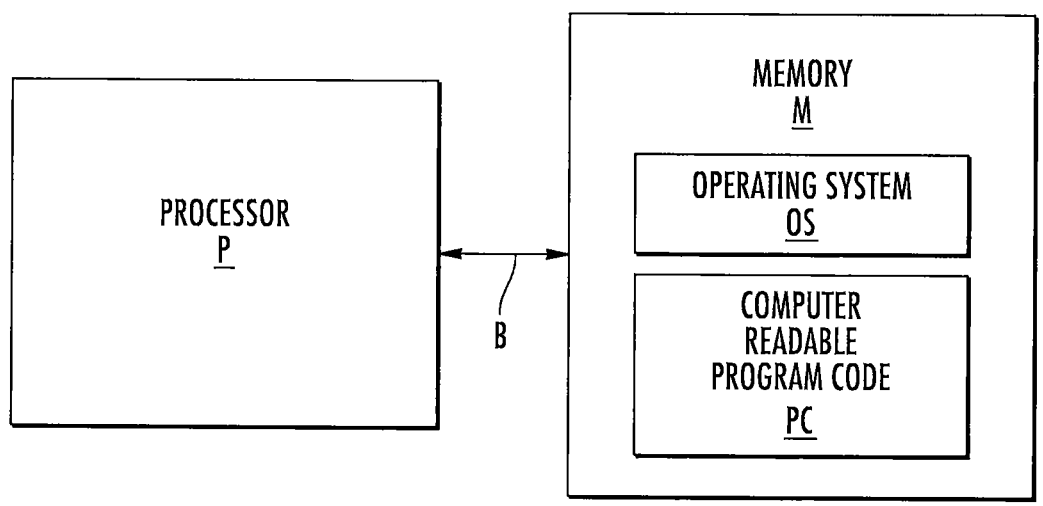
FIG. 11 is a block diagram that illustrates details of an example processor and memory that may be used in accordance with various embodiments.

FIG. 11 is a block diagram that illustrates details of an example processor P and memory M that may be used in accordance with various embodiments. Each controller 5 (FIG. 2) may include a processor P and a memory M. The processor P communicates with the memory M via an address/data bus B. The processor P may be, for example, a commercially available or custom microprocessor. Moreover, the processor P may include multiple processors. The memory M may be a non-transitory computer readable storage medium and may be representative of the overall hierarchy of memory devices containing the software and data used to implement various functions of a GAUPS device 1 as described herein. The memory M may include, but is not limited to, the following types of devices: cache, ROM, PROM, EPROM, EEPROM, flash, Static RAM ("SRAM"), and Dynamic RAM ("DRAM").

As shown in FIG. 11, the memory M may hold various categories of software and data, such as computer readable program code PC and/or an operating system OS. The operating system OS controls operations of a GAUPS device 1. In some embodiments, the operating system OS may manage the resources of the GAUPS device 1 and may coordinate execution of various programs by the processor P. For example, the computer readable program code PC, when executed by a processor P of a controller 5 (or processors P of respective controllers 5), may cause the processor(s) P to perform any of the operations illustrated in the flowchart of FIG. 12.

Figure 12:
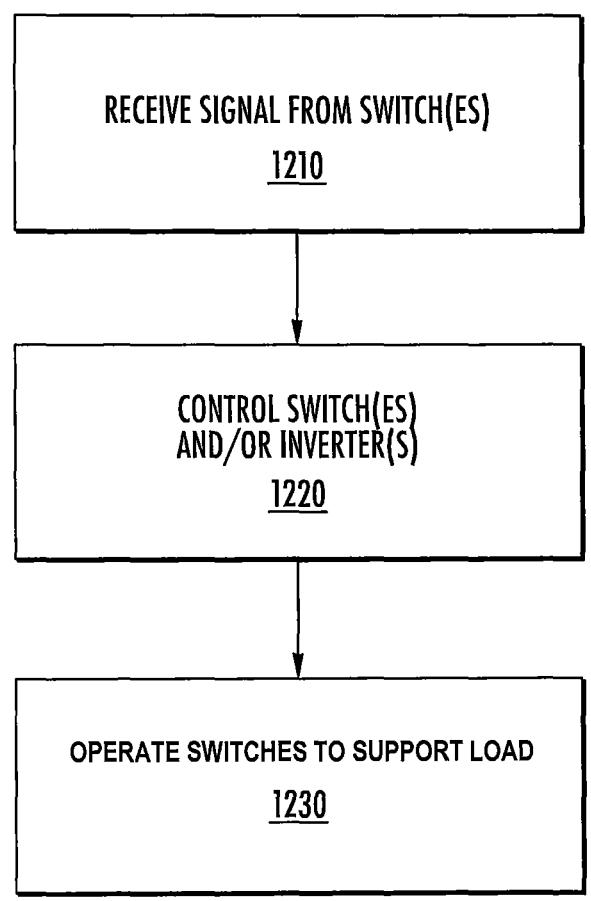
FIG. 12 is a flowchart of operations of controlling the GAUPS device of FIG. 2, according to embodiments of the present invention.

FIG. 12 is a flowchart of operations of controlling the GAUPS device 1 of FIG. 2. The operations include receiving (Block 1210) a signal from a switch $1e$ at a controller 105. For example, the signal may indicate demand for power by a load 4. In some embodiments, the same controller 105 or a different controller 105 may receive a signal from a switch $1f$, and this signal may indicate demand for power by a grid 2.

In response to receiving the signal(s), the controller(s) 105 may control (Block 1220) the switch $1e$ and/or the switch $1f$ to open and/or close. Moreover, the controller(s) 105 may control inverters $1b$ and/or $1c$. In particular, the controller(s) 105 may control the switches $1e$, $1f$ and the inverters $1b$, $1c$ to balance inverter efficiency and power quality, including the quality of power supplied to the load 4. For example, the controller(s) 105 may control the switches $1e$, $1f$ and the inverters $1b$, $1c$ so that the GAUPS device 1 will operate in one of the following modes: (a) offline-ancillary mode, (b) double-conversion-ancillary mode, (c) grid-connected ancillary mode, or (d) independent mode. In some embodiments, the controller(s) 105 may control the switches $1e$, $1f$ and the inverters $1b$, $1c$ to switch (i.e., transition) from a first one of the modes (a)-(d) to a different, second one of the modes (a)-(d).

In some embodiments, the controller(s) 105 may operate (Block 1230) the switches $1e$, $1f$ to support (e.g., to manage the quality of power supplied to) the load 4. For example, in response to identifying that low-quality power (e.g., power below a threshold quality level) is being supplied from the grid 2 to the load 4, the controller(s) 105 may open the switch $1f$ (and/or close the switch $1e$) so that an energy storage element 3 can supply power to the load 4.

The specifics of various embodiments of the invention are shown in some drawings and not in others. This is for convenience and simplicity of understanding only. This detailed description uses the figures to disclose example embodiments of the invention, and to enable a person to make use of the invention by performing the incorporated methods. The disclosed embodiments are meant to be illustrative only and not to limit the scope of invention, which is defined by the claims.

The following are example embodiments of the invention:

1. An integrated architecture for a grid ancillary and uninterruptible power supply to provide AC power from the utility grid to the sensitive load while simultaneously provide ancillary services to the grid, comprising:
    a. An inverter coupled with the AC power source or grid, configured to receive and send power to the grid (four-quadrant operation).
    b. Another inverter coupled with the sensitive loads, configured to transfer power to the loads in certain configurations of the GAUPS. This inverter is responsible to provide a constant voltage and frequency to the sensitive loads.
    c. Energy storage element connected to the DC the link coupled with the two inverters connected back-to-back with each other on the DC side of their topology. This internal DC storage is used to supply power to the sensitive loads and ancillary services depending on the type of configuration mode of the GAUPS.
    d. A transfer switch to integrate or isolate the load-side inverter selectively to the sensitive loads during the stated modes of operation of the GAUPS.
    e. A transfer switch to integrate or isolate the AC power source or the grid selectively to the sensitive load during the said modes of operation of the GAUPS.
    f. A controller capable of generating two independent PWM pulses and ADC for data acquisition in order to perform control actions.

2. The grid ancillary and uninterruptible power supply of item 1 wherein the device/system provides for UPS application as well as ancillary services to the AC power source or utility grid.

3. The grid ancillary and uninterruptible power supply of item 1 further comprising of load-side inverter control to provide regulated voltage and frequency to the sensitive loads, comprising of following steps:
    a. Monitoring the output voltage of the load-side inverter and providing the per unitized signal to the outer loop of the dq-based controller. Any changes in the load causes the voltage dynamics, this generates a current signal inside the controller based on the error signal generated and hence asks the energy to transfer from the DC side to the AC side.
    b. Monitored output voltage d- and q-axis is aligned with 1 and 0 in the SF-PLL block and the frequency generated from the phase locked loop keeps the frequency constant at 60 Hz.

4. The grid ancillary and uninterruptible power supply of item 1 further comprising of grid-side inverter control to provide ancillary power demanded by the grid, comprising of following steps:
    a. Monitoring AC line voltage and current on the output of the grid-side inverter and hence the power output.
    b. Per unitized values are provided to the controller.
    c. Altering the monitored power to the reference power provided by the utility is performed controlling the current flowing through the output filter as the AC power source or grid is considered to be stiff and holds the voltage constant.

5. The grid ancillary and uninterruptible power supply of item 1 wherein the transfer operation between the AC power source or grid and the energy source/storage for supporting ancillary as well as sensitive loads, comprises of steps:
    a. If the voltage of the monitored AC power sources goes above or below a certain threshold value, the transfer operation takes place from the grid directly coupled with the load to the load-side inverter being coupled with the load.
    b. The energy storage feeding the load depends on the transfer stated in (a) and ancillary service demand.
    c. If ancillary service is required/demanded and the grid is not able to provide for the load, the load-side inverter consumes power for the energy storage.
    d. In any other case, the grid provides for the load directly or indirectly via the double-conversion ancillary mode 6. The grid ancillary and uninterruptible power supply of item 4 and 5 further includes the independent operation of ancillary and sensitive load demand services from the GAUPS. During, the offline ancillary mode, the battery alone is able to provide the dual power management services.

7. The method of any of items 3, 4, and 5, wherein the process of data acquisition and control is performed by one processor.

A GAUPS device according to embodiments of the present invention may provide a number of advantages relative to conventional UPS devices. These advantages include:

1. The GAUPS device can provide UPS functionality and simultaneously support grid ancillary services by controlling active and reactive power dispatch or consumption (on grid power input side).

2. The GAUPS device can provide superior control that can automatically switch between modes without affecting the quality and power management capability.

3. The GAUPS device can provide independent operation of a grid ancillary service and a UPS service at the same time.

That which is claimed is:

1. A system comprising:
    an energy storage device that is configured to supply power to a load and to supply power to a utility grid;
    a bidirectional inverter that is coupled between the utility grid and the energy storage device on a first path;
    a unidirectional inverter that is coupled between the bidirectional inverter and the load;
    a switch between the unidirectional inverter and the load;
    a controller configured to control at least the bidirectional inverter and the switch to operate the system in at least a first mode in which power is supplied to the load from the utility grid while power is supplied to the utility grid from the energy storage device via the bidirectional inverter and a second mode in which power is supplied to the load from the utility grid via the bidirectional inverter,
    wherein the energy storage device is coupled between the bidirectional inverter and the unidirectional inverter.

2. The system of claim 1,
    wherein the energy storage device comprises a battery, and
    wherein the load comprises a 50-400 kilowatt load.

3. The system of claim 1, wherein the bidirectional inverter and the unidirectional inverter are configured to convert power in a range of 50-400 kilowatts.

4. The system of claim 1, wherein the system is free of any direct current (DC)-to-DC converter.

5. The system of claim 1, further comprising a sensor that is coupled between the unidirectional inverter and the load, wherein the sensor is configured to detect power demand by the load.

6. A device comprising:
an energy storage device;
a bidirectional inverter that is coupled between a utility grid and the energy storage device;
a unidirectional inverter that is coupled between the bidirectional inverter and a load;
a switch between the unidirectional inverter and the load;
a controller configured to control at least the bidirectional inverter and the switch to operate the device at least in a first mode in which power is supplied to the load from the utility grid while power is supplied to the utility grid from the energy storage device via the bidirectional inverter, in a second mode in which power is supplied to the load from the utility grid via the bidirectional inverter and conditioned with power from the energy storage device, and in a third mode in which power is supplied both to the load and to the utility grid from the energy storage device,
wherein the energy storage device is coupled between the bidirectional inverter and the unidirectional inverter.

7. The device of claim 6, wherein the load comprises a 50-400 kilowatt load.

8. The device of claim 6, wherein the bidirectional inverter and the unidirectional inverter are configured to convert power in a range of 50-400 kilowatts.

9. The device of claim 6, wherein the device is free of any direct current (DC)-to-DC converter.

10. The device of claim 6, wherein the device is configured to use the bidirectional inverter and the unidirectional inverter independently of each other.

11. The device of claim 6, further comprising a housing, wherein the bidirectional inverter and the unidirectional inverter are inside the housing.

12. The device of claim 11, wherein the housing has dimensions of 25 feet by 25 feet or smaller.

13. The device of claim 6, wherein the bidirectional inverter and the unidirectional inverter are spaced apart from each other by no more than 30 feet.

14. The device of claim 6, further comprising a sensor that is coupled between the unidirectional inverter and the load, wherein the sensor is configured to detect power demand by the load.

15. A method of operating a grid ancillary service with an uninterruptible power supply (GAUPS) device comprising a controller, a bidirectional inverter, a unidirectional inverter, a switch, a sensor, and an energy storage device, the method comprising:
controlling, by the controller in a first mode of the GAUPS device, the switch and the bidirectional inverter in response to a signal that is generated by the sensor to supply power to a load from a utility grid while power is supplied to the utility grid from the energy storage device via the bidirectional inverter,
wherein the switch is coupled between the unidirectional inverter and the load,
wherein the unidirectional inverter is coupled between the bidirectional inverter and the load,
wherein the bidirectional inverter is coupled between a utility grid and the energy storage device, and
wherein the energy storage device is coupled between the bidirectional inverter and the unidirectional inverter.

16. The method of claim 15, further comprising switching from the first mode of the GAUPS device to a second mode of the GAUPS device in which power is supplied to the load from the utility grid via the bidirectional inverter.

17. The method of claim 15, wherein the controller is configured to operate the GAUPS device in the first mode in response to a demand for ancillary services received from the utility grid.

18. The system of claim 1, wherein the controller is configured to operate the system in the first mode in response to a demand for ancillary services received from the utility grid.

19. The system of claim 1, wherein the controller is configured to operate the system in a third mode in which power is supplied to the energy storage device from the utility grid while power is supplied to the load from the utility grid via the switch.

20. The device of claim 6, wherein the controller is configured to operate the device in a fourth mode in which power is supplied to the energy storage device from the utility grid while power is supplied to the load from the utility grid via the switch.

* * * * *